United States Patent [19]
Nelson

[11] 3,735,274
[45] May 22, 1973

[54] THERMOCOUPLE SIGNAL AMPLIFIER

[75] Inventor: Robert E. Nelson, Indianapolis, Ind.

[73] Assignee: General Motors Corporation, Detroit, Mich.

[22] Filed: Aug. 10, 1971

[21] Appl. No.: 170,562

[52] U.S. Cl..........................330/1 A, 330/9, 330/35, 330/10
[51] Int. Cl................................................H03f 1/02
[58] Field of Search..........................330/9, 10, 1 A

[56] References Cited

UNITED STATES PATENTS

| | | | |
|---|---|---|---|
| 3,541,320 | 11/1970 | Beall | 330/9 X |
| 3,399,358 | 8/1968 | Rinehart | 330/9 X |
| 3,454,887 | 7/1969 | Gebo | 330/10 |
| 3,424,981 | 1/1969 | Erdman | 330/10 X |

*Primary Examiner*—Nathan Kaufman
*Attorney*—J. L. Carpenter and Paul Fitzpatrick

[57] ABSTRACT

Apparatus for generating an amplified DC voltage signal that is (a) proportional to a DC voltage generated by a thermocouple, (b) of an amplitude determined by a feedback impedance, and (c) substantially independent of instrumentation drift. A temperature compensating and summation network generates a control signal. A modulator alternately applies the control signal and a reference signal to an AC amplifier. A demodulator intermittently applies the AC component of the amplified signal to an integrator. An oscillator controls the modulator and demodulator so the integrator output signal is a DC signal proportional to the thermocouple voltage, the DC signal being returned through the feedback impedance to control system gain.

2 Claims, 1 Drawing Figure

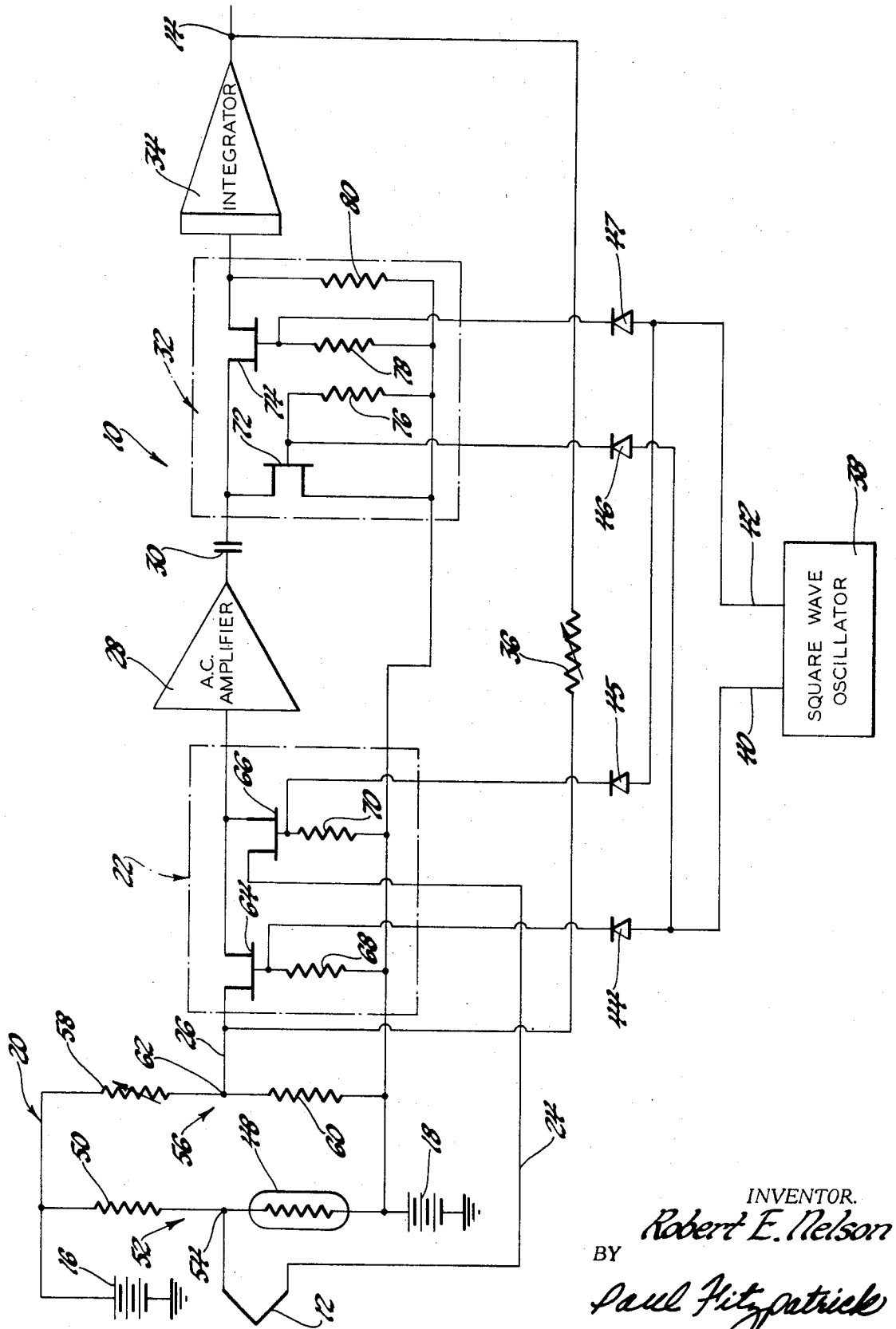

THERMOCOUPLE SIGNAL AMPLIFIER

This invention relates to amplification of DC voltage signals and, more particularly, to the amplification of a voltage signal generated by a thermocouple.

Thermocouple voltage signals are too low in power to provide many desired control functions. It is therefore often desired to amplify a thermocouple voltage signal to provide an amplified DC voltage signal that is proportional to the thermocouple voltage signal. However, DC amplifiers often are accompanied by drift problems, particularly when the amplifiers are operated over a large ambient temperature range. The drift problems encountered generally necessitate frequent recalibration of the instrument and often cause an erroneous signal to be generated. While precision circuit elements can to a certain extent reduce the drift problems, the use of precision circuit elements greatly increases the cost of the amplifier.

It is therefore an object of this invention to provide an amplifier for DC thermocouple signals which is not subject to drift conditions and which modulates the thermocouple signal, amplifies the modulated signal, demodulates the amplified signal and provides negative feedback in a manner which eliminates the need for precision elements within the amplifier.

The foregoing and other objects and advantages of the subject invention will become apparent from the following description and accompanying drawing, in which is presented a schematic diagram of a thermocouple signal amplifier embodying the principles of the subject invention.

As shown in the drawings, a thermocouple signal amplifier 10 which embodies the principles of the subject invention is provided for amplifying the DC voltage generated by a thermocouple 12 and presenting the amplified DC signal on an output terminal 14, the potential of which is compared to the system ground. The amplified 10 includes a first battery 16, which is approximately a 9.5 volt power source in the preferred embodiment, and a second battery 18, which is approximately a 3 volt power source in the preferred embodiment. The batteries 16 and 18, each of which has one terminal grounded, supply power to a temperature compensation and summation network 20 and a modulator 22. The temperature compensation and summation network 20 adds a bias voltage signal to the signal generated by the thermocouple 12 in accordance with ambient temperature, the algebraic sum of the bias and thermocouple signals forming a control signal on a lead 24. The temperature compensation and summation network 20 also generates a reference voltage signal, which is selected to be equal to the bias voltage signal at a predetermined ambient temperature, on a lead 26.

The reference and control signals are alternately applied by the modulator 22 to an input terminal of an AC amplifier 28. When the control signal differs from the reference signal the AC amplifier 28 generates an amplified signal including both AC and DC components on its output terminal. The output terminal of the AC amplifier 28 is connected to one side of a capacitor 30, which blocks the transmission of the DC signal components but transmits the AC components of the signal from the AC amplifier 28 to a demodulator 32. The demodulator 32 alternatively discharges the capacitor 30 and connects the capacitor 30 to the input terminal of an integrator 34, which generates the DC signal on the output terminal 14. The output terminal 14 is connected through a feedback resistor 36 to the lead 26, on which the reference voltage signal is generated by the temperature compensation and summation network 20.

The thermocouple signal amplifier 10 also includes a dual output square wave oscillator 38 which, by way of example, may be an astable multivibrator. The oscillator 38 has first and second output terminals 40 and 42 that are each connected to the modulator 22 and the demodulator 32 by several diodes 44 through 47 that prevent feedback between the modulator 22 and the demodulator 32 stages of the amplifier 10. The oscillator 38 thus synchronizes the operation of the modulator 22 and the demodulator 32, as will now be explained in detail.

The temperature compensation and summation network 20 includes a temperature responsive resistor element 48, which is sometimes termed a thermistor element, connected in series with a resistor 50 between the positive terminals of the batteries 16 and 18. The resistors 48 and 50 thus form a voltage divider 52 and the voltage at the junction 54 between them varies in accordance with changes in the ambient temperature as sensed by the temperature responsive resistor 48. Since the thermocouple 12 is connected between the junction 54 and the lead 24 the control signal on the lead 24 is equal to the algebraic sum of the bias voltage at the junction 54 and the voltage generated by the thermocouple 12.

The temperature compensation and summation network 20 also includes a second voltage divider 56, which comprises a variable resistor 58 and a fixed resistor 60, connected in parallel with the first voltage divider 52. The variable resistor 58 is adjusted so the voltage at the junction 62 between the resistors 58 and 60 is equal to the bias voltage of the junction 54 at a certain ambient temperature. The junction 62 voltage is thus established at a reference voltage that differs from the control signal on the lead 24 by an amount equal to the thermocouple 12 signal as compensated to allow for changes in ambient temperature.

The modulator 22 includes first and second field effect transistors (FET's) 64 and 66 which have their respective drains connected to the leads 26 and 24 for receiving the reference and control signals. The sources of the FET's 64 and 66 are both connected to the input terminal of the AC amplifier 28 and the gate terminals of the FET's 64 and 66 are connected through bias resistors 68 and 70 to the positive terminal of the battery 18. The gates of the FET's 64 and 66 are also connected through the diodes 44 and 45 to the output terminals 40 and 42 of the oscillator 38. The oscillator 38 generates the same square wave voltage signal on the output terminals 40 and 42, but these square wave signals are out of phase from each other. Accordingly, one of the FET's 64 or 66 is always biased to a conductive condition so as to apply either the reference or the control signal to the AC amplifier 28 at all times.

The output terminals 40 and 42 of the oscillator 38 are also connected through the diodes 46 and 47 to the gate terminals of third and fourth field effect transistors (FET's) 72 and 74 in the demodulator 32, which also includes several resistors 76, 78, and 80. The drains of the third and fourth FET's 72 and 74 are both connected to the capacitor 30. The source of the third FET 72 is connected to the battery 18 for discharging the capacitor 30 whenever the third FET is conductive and the source of the fourth FET 74 is connected to the input terminal of the integrator 34. Since the first output terminal 40 of the oscillator 38 is connected to the gate of both the first and the third FET's 64 and 72 and the second output terminal 42 of the oscillator 38 is connected to the gate terminal of the second and fourth FET's 66 and 74, the first and third FET's 64 and 72 are thus simultaneously operated and are conductive when the second and fourth FET's 66 and 74, which are also synchronized in operation, are nonconductive. Similarly, the second and fourth FET's are conductive when the first and third FET's are nonconductive.

Accordingly, when the thermocouple signal amplifier 10 is in operation and the first and third FET's 64 and 72 are conductive the reference voltage signal is applied to the AC amplifier 28 input terminal and the capacitor 30 is discharged. After a brief moment, which is determined by the oscillator 38 frequency, the second and fourth FET's 66 and 74 are conductive so as to apply the control signal from the lead 24 to the AC amplifier 28 and to apply the AC component of the amplified signal from the capacitor 30 to the integrator 34. It thus follows that upon application of a voltage to the integrator 34 input terminal the integrator 34 generates a ramp, or uniformly increasing, voltage signal on the output terminal 14.

The output voltage signal generated by the integrator 34 is returned through the feedback resistor 36 to the junction 62 in the temperature compensation and summation network 20 and causes an increase in current through the resistor 60 to the battery 18. This increased current through the resistor 60 increases the voltage at the junction 62 so as to increase the reference voltage signal being applied by the first FET 64 to the AC amplifier 28. Accordingly, the net difference between the reference voltage signal and the control signal decreases as the voltage on the output terminal 14 approaches the value of the thermocouple 12 voltage signal multiplied by the amplification factor of the thermocouple signal amplifier 10. When the voltage on the output terminal 14 equals the thermocouple 12 voltage multiplied by the amplification factor of the thermocouple signal amplifier 10 the voltage at the drain terminal of the first FET 64 equals the control signal voltage on the lead 24, which signal is applied to the drain terminal of the second FET 66. When this occurs the voltage applied to the input terminal of the AC amplifier 28 remains constant regardless of which of the FET's 64 or 66 is conductive. Since the input signal to the AC amplifier 28 is a DC signal at this time there is no AC component in the output signal of the amplifier 28. The signal applied to the integrator 34 by the demodulator 32 thus no longer causes a change in the voltage on the output terminal 14 and the output terminal 14 voltage remains constant and equal to the thermocouple 12 voltage multiplied by the amplification factor of thermocouple signal amplifier 10.

Should the control signal on the lead 24 change due to either a change in the ambient temperature as sensed by the temperature responsive resistor 48 or a change in the thermocouple voltage, a corresponding change in the voltage on the output terminal 14 will be effected until once again the voltage on the output terminal 14 is equal to the thermocouple 12 voltage multiplied by the amplification factor of the thermocouple signal amplifier 10, as persons versed in the art will appreciate. Since this amplification of the DC signal from the thermocouple 12 is effected without employing a DC signal amplifier, it will be noted that thermocouple signal amplifier 10 is extremely free from drift problems normally associated with DC amplifiers. In addition, it will also be noted that even though the gain of the AC amplifier 28 and the integrator 34 contribute to the overall gain of the thermocouple signal amplifier 10, the actual amplification factor of the thermocouple signal amplifier 10 may be determined solely by selection of the feedback resistor 36. That is, once the AC amplifier 28 and the integrator 34 have been selected the amplification factor of the thermocouple signal amplifier 10 may be determined simply by varying the resistance of the feedback resistor 36.

While the foregoing description has been directed toward a preferred embodiment of the subject invention, persons versed in the art will appreciate that various modifications of the invention may be made without departing from its spirit.

What is claimed is:

1. Apparatus for amplifying a small DC voltage signal from a thermocouple comprising, in combination, a point of reference potential, means for adding a first voltage signal to the DC voltage signal generated by the thermocouple so as to generate a control signal that is equal to their algebraic sum, said means varying said first voltage signal in response to ambient temperature variations, means for generating a second voltage signal equal to the first voltage signal at a certain ambient temperature, an AC amplifier having input and output terminals, a modulator for alternatively applying the control and second signals to the input terminal of the AC amplifier, the AC amplifier generating an amplified signal on the output terminal that is indicative of the voltage signal on the input terminal, signal separating means coupled to the output terminal of the AC amplifier for blocking the DC component of the amplified signal and passing the AC component thereof, an integrator having input and output terminals, a demodulator for alternately coupling the AC component of the amplified signal from the signal separating means to the point of reference potential and applying the AC component of the amplified signal to the input terminal of the integrator, a feedback impedance connected between the integrator output terminal and the means for generating the second voltage signal for effecting a change in the second voltage signal in response to voltage changes at the integrator output terminal, and an oscillator having first and second output terminals that are each connected to the modulator and demodulator, the oscillator controlling the modulator and demodulator by alternatively generating first and second timing signals on its respective first and second output terminals, the first timing signal causing the modulator to apply the second voltage signal to the AC amplifier input terminal and causing the demodulator to couple the AC component of the amplified signal to the point of reference potential and the second timing signal causing the modulator to apply the control signal to the input terminal of the AC amplifier and causing the demodulator to apply the AC component of the amplified signal to the integrator input terminal, the integrator thereby generating a signal on its output terminal that is indicative of the DC voltage signal and is of an amplitude determined by the feedback impedance magnitude.

2. Apparatus for amplifying a small DC voltage signal from a thermocouple comprising, in combination, a point of reference potential, means for adding a first voltage signal to the DC voltage signal so as to generate a control signal that is equal to their algebraic sum, said means varying said first voltage signal in response to ambient temperature variations, means for generating a second voltage signal equal to the first voltage signal at a certain ambient temperature, an AC amplifier having input and output terminals, a modulator for alternately applying the control and second signals to the input terminals of the AC amplifier whereby the AC amplifier generates an amplified signal at its output terminal that is indicative of the voltage signal on the input terminal, the modulator including a first controlled switch defining a controlled current path between the means for generating the second voltage signal and the AC amplifier input terminal and a second controlled switch defining a second controlled current path between the thermocouple and the AC amplifier input terminal, the first and second controlled switches having respective first and second control terminals and being effective to close the respective first and second current paths when a certain potential is applied to the control terminal of the corresponding controlled switch, a blocking capacitor having one terminal connected to the output terminal of the AC amplifier for separating the AC and DC components of the amplified signal, an integrator having input and output terminals, a demodulator connected between the other terminal of the capacitor and the integrator input terminal for alternatively discharging the capacitor and applying the AC component of the amplified signal to the input terminal of the integrator, the demodulator including a third controlled switch defining a controlled discharge path from the capacitor to the point of reference potential and a fourth controlled switch defining a current path from the capacitor to the integrator input terminal, the third and fourth controlled switches each having a control terminal and each being effective upon application of a certain potential to the control terminal to complete the respective currents paths, a feedback impedance connected between the integrator output terminal and the means for generating the second voltage signal for effecting a change in the second voltage signal in response to voltage changes at the integrator output terminal, and an oscillator having first and second output terminals on which are alternately generated first and second timing signals of the certain potential, the first output terminal of the oscillator being connected to the control terminal of the first and third controlled switches and the second output terminal of the oscillator being connected to the control terminal of the second and fourth controlled switches so as to effect closure of the first and third controlled current paths during a first time interval and closure of the second and fourth controlled current paths during a second time interval whereby the integrator generates a signal on its output terminal that is indicative of the DC voltage signal and is of an amplitude determined by the magnitude of the feedback impedance.

* * * * *

UNITED STATES PATENT OFFICE
CERTIFICATE OF CORRECTION

Patent No. 3,735,274           Dated May 22, 1973

Inventor(s) Robert E. Nelson

It is certified that error appears in the above-identified patent and that said Letters Patent are hereby corrected as shown below:

Column 1, line 38, "amplified" should read -- amplifier --.

Column 4, claim 1, line 32, "alternatively" should read -- alternately --.

Column 4, claim 1, line 53, "alternatively" should read -- alternately --.

Column 6, claim 2, line 1, "alternatively" should read -- alternately --.

Signed and sealed this 27th day of November 1973.

(SEAL)
Attest:

EDWARD M. FLETCHER, JR.
Attesting Officer

RENE D. TEGTMEYER
Acting Commissioner of Patents